(12) United States Patent
Liu et al.

(10) Patent No.: US 11,385,931 B2
(45) Date of Patent: Jul. 12, 2022

(54) METHOD, ELECTRONIC DEVICE, AND COMPUTER PROGRAM PRODUCT FOR PROCESSING COMPUTING JOB

(71) Applicant: EMC IP Holding Company LLC, Hopkinton, MA (US)

(72) Inventors: Jinpeng Liu, Shanghai (CN); Jin Li, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 38 days.

(21) Appl. No.: 16/887,573

(22) Filed: May 29, 2020

(65) Prior Publication Data
US 2021/0342184 A1    Nov. 4, 2021

(30) Foreign Application Priority Data
Apr. 29, 2020    (CN) .......................... 202010359328.8

(51) Int. Cl.
*G06F 8/41*     (2018.01)
*G06F 9/38*     (2018.01)
(Continued)

(52) U.S. Cl.
CPC .......... *G06F 9/4881* (2013.01); *G06F 9/3838* (2013.01); *G06F 9/5083* (2013.01)

(58) Field of Classification Search
None
See application file for complete search history.

(56) References Cited

U.S. PATENT DOCUMENTS 5,561,774 A * 10/1996 Aikawa ................. G06F 9/3863
                                                    712/E9.071
6,968,533 B1 * 11/2005 Ueda ..................... G06N 5/022
                                                    706/46
(Continued)

OTHER PUBLICATIONS

Wikipedia, "Intermediate Representation," https://en.wikipedia.org/w/index.php?title=Intermediate_representation&direction=next&oldid=905361000, Jan. 24, 2020, 4 pages.

(Continued)

*Primary Examiner* — Hyun Nam
(74) *Attorney, Agent, or Firm* — Ryan, Mason & Lewis, LLP

(57) ABSTRACT

Embodiments disclosed herein provide a method, an electronic device, and a computer program product for processing a computing job. The method includes determining a first dependency relationship between a plurality of computing tasks included in a to-be-processed computing job. The method further includes determining, based on the first dependency relationship and demands of the plurality of computing tasks for computing resources, a group of computing tasks for combination from the plurality of computing tasks. The method further includes combining the group of computing tasks into a target computing task. The method further includes determining, based on the first dependency relationship, a second dependency relationship between the target computing task and computing tasks that are other than the group of computing tasks in the plurality of computing tasks. The embodiments according to the present disclosure can reduce data movement during processing of a computing job, and are beneficial to load balancing.

20 Claims, 10 Drawing Sheets

(51) Int. Cl.
*G06F 9/48* (2006.01)
*G06F 9/50* (2006.01)

(56) References Cited

U.S. PATENT DOCUMENTS

| | | | | |
|---|---|---|---|---|
| 2002/0138571 | A1* | 9/2002 | Trinon | G06Q 10/10 709/204 |
| 2014/0298321 | A1* | 10/2014 | Morino | G06F 8/61 717/175 |
| 2019/0324810 | A1 | 10/2019 | Zhao et al. | |

OTHER PUBLICATIONS

Jia et al., "Beyond Data and Model Parallelism for Deep Neural Networks," Proceedings of the 2nd SysML Conference, Palo Alto, CA, Jul. 2018, 13 pages.
Wikipedia, "Deep Learning," https://en.wikipedia.org/wiki/Deep_learning, Feb. 6, 2020, 33 pages.
Wikipedia, "Everything as a Service," https://simple.wikipedia.org/wiki/Everything_as_a_service, Aug. 23, 2019, 2 pages.
L. Song et al., "HyPar: Towards Hybrid Parallelism for Deep Learning Accelerator Array," arXiv:1901.02067v1, Jan. 7, 2019, 13 pages.
U.S. Appl. No. 16/540,385 filed in the name of Jinpeng Liu et al. on Aug. 14, 2019, and entitled "Method, a Device and a Computer Program Product for Determining a Resource Required for Executing a Code Segment."
U.S. Appl. No. 16/542,757 filed in the name of Jinpeng Liu et al. on Aug. 16, 2019, and entitled "Method, Device and Computer Program Product for Processing Machine Learning Model."
U.S. Appl. No. 16/678,758 filed in the name of Jinpeng Liu et al. on Nov. 8, 2019, and entitled "Method, Electronic Device and Computer Program Product for Processing Machine Learning Model."
U.S. Appl. No. 16/789,006 filed in the name of Jin Li et al. on Feb. 12, 2020, and entitled "Scheduling Artificial Intelligence Model Partitions Based on Reversed Computation Graph."
U.S. Appl. No. 16/823,445 filed in the name of Jinpeng Liu et al. on Mar. 19, 2020, and entitled "Task Scheduling Method, Electronic Device, and Computer Storage Medium."
U.S. Appl. No. 16/845,692 filed in the name of Jinpeng Liu et al. on Apr. 10, 2020, and entitled "Method, Device and Computer Program Product for Processing Computing Job."
U.S. Appl. No. 16/886,131 filed in the name of Jin Li et al. on May 28, 2020, and entitled "Method, Electronic Device, and Computer Program Product for Processing Data."

* cited by examiner

| | | | |
|---|---|---|---|
| 0 | fused_add_5 | 2052 | 512 |
| 1 | fused_sqrt | 2048 | 512 |
| 2 | fused_divide | 2052 | 512 |
| 3 | fused_add_6 | 3072 | 512 |
| 4 | fused_expand_dims | 2048 | 512 |
| 5 | fused_add_7 | 4100 | 512 |
| 6 | fused_sqrt_1 | 4096 | 512 |
| 7 | fused_divide_1 | 4100 | 512 |
| 8 | fused_add_8 | 6144 | 512 |
| 9 | fused_expand_dims_1 | 4096 | 512 |
| 10 | fused_add_9 | 8196 | 1024 |
| 11 | fused_sqrt_2 | 8192 | 1024 |
| 12 | fused_divide_2 | 8196 | 1024 |
| 13 | fused_add_10 | 12288 | 1024 |
| 14 | fused_expand_dims_2 | 8192 | 1024 |
| 15 | fused_add_11 | 16388 | 2048 |
| 16 | fused_sqrt_3 | 16384 | 2048 |
| 17 | fused_divide_3 | 16388 | 2048 |
| 18 | fused_add_12 | 24576 | 2048 |
| 19 | fused_expand_dims_3 | 16384 | 2048 |
| 20 | fused_nn_relu_2 | 65536 | 8192 |
| 21 | fused_add_13 | 32772 | 4096 |
| 22 | fused_sqrt_4 | 32768 | 4096 |
| 23 | fused_divide_4 | 32772 | 4096 |
| 24 | fused_add_14 | 49152 | 4096 |
| 25 | fused_expand_dims_4 | 32768 | 4096 |
| 26 | fused_nn_max_pool2d | 81920 | 4096 |
| 27 | fused_nn_relu | 32768 | 4096 |
| 28 | fused_transpose | 32768 | 4096 |
| 29 | fused_nn_batch_flatten | 32768 | 4096 |
| 30 | fused_nn_bias_add | 120 | 512 |
| 31 | fused_nn_softmax | 8272 | 64 |

FIG. 7A

| | | | |
|---|---|---|---|
| 0 | fused_add_5 | 2052 | 512 |
| 1 | fused_add_6 | 3072 | 512 |
| 2 | fused_expand_dims | 2048 | 512 |
| 3 | fused_add_7 | 4100 | 512 |
| 4 | fused_sqrt_1 | 4096 | 512 |
| 5 | fused_divide_1 | 4100 | 512 |
| 6 | fused_add_8 | 6144 | 512 |
| 7 | fused_expand_dims_1 | 4096 | 512 |
| 8 | fused_add_9 | 8196 | 1024 |
| 9 | fused_sqrt_2 | 8192 | 1024 |
| 10 | fused_divide_2 | 8196 | 1024 |
| 11 | fused_add_10 | 12288 | 1024 |
| 12 | fused_expand_dims_2 | 8192 | 1024 |
| 13 | fused_add_11 | 16388 | 2048 |
| 14 | fused_sqrt_3 | 16384 | 2048 |
| 15 | fused_divide_3 | 16388 | 2048 |
| 16 | fused_add_12 | 24576 | 2048 |
| 17 | fused_expand_dims_3 | 16384 | 2048 |
| 18 | fused_nn_relu_2 | 65536 | 8192 |
| 19 | fused_add_13 | 32772 | 4096 |
| 20 | fused_sqrt_4 | 32768 | 4096 |
| 21 | fused_divide_4 | 32772 | 4096 |
| 22 | fused_add_14 | 49152 | 4096 |
| 23 | fused_expand_dims_4 | 32768 | 4096 |
| 24 | fused_nn_max_pool2d | 81920 | 4096 |
| 25 | fused_nn_relu | 32768 | 4096 |
| 26 | fused_transpose | 32768 | 4096 |
| 27 | fused_nn_batch_flatten | 32768 | 4096 |
| 28 | fused_nn_bias_add | 120 | 512 |
| 29 | fused_nn_softmax | 8272 | 64 |
| 30 | fused_test_sqrt_divide | 3510 | 512 |

FIG. 7B

METHOD, ELECTRONIC DEVICE, AND COMPUTER PROGRAM PRODUCT FOR PROCESSING COMPUTING JOB

RELATED APPLICATION(S)

The present application claims priority to Chinese Patent Application No. 202010359328.8, filed Apr. 29, 2020, and entitled "Method, Electronic Device, and Computer Program Product for Processing Computing Job," which is incorporated by reference herein in its entirety.

FIELD

Embodiments of the present disclosure relate to management of a computing job, and more specifically, to a method, a device, and a computer program product for processing an artificial intelligence model-based computing job.

BACKGROUND

Artificial intelligence (AI) (e.g., machine learning (ML), deep learning (DL), and data mining (DM)) technologies have been widely developed, and a large number of artificial intelligence applications have been used in various application fields. These applications can use various resources, such as processing and storage resources, to complete various computing jobs.

As the complexity of artificial intelligence jobs is very high and continuously increased, a large and/or variable quantity of dedicated processing resources are required to ensure the normal operation of corresponding computing jobs. For example, a cloud-based computing system has been developed, and such a computing system may include a machine (e.g., a server) with one or more dedicated processing resources. In this computing system, different client terminals may use (for example, lease) dedicated resources in the computing system as needed to run their respective computing jobs. However, as computing workloads involved in various computing jobs are greatly different, it is difficult to effectively use computing resources in the computing system. Therefore, how to manage a computing job more effectively has become an increasingly important area of research.

SUMMARY

Embodiments of the present disclosure provide a solution for processing a computing job.

In a first aspect of the present disclosure, a method for processing a computing job is provided. The method includes determining a first dependency relationship between a plurality of computing tasks included in a to-be-processed computing job. The method further includes determining, based on the first dependency relationship and demands of the plurality of computing tasks for computing resources, a group of computing tasks for combination from the plurality of computing tasks. The method further includes combining the group of computing tasks into a target computing task. The method further includes determining, based on the first dependency relationship, a second dependency relationship between the target computing task and computing tasks that are other than the group of computing tasks in the plurality of computing tasks.

In a second aspect of the present disclosure, an electronic device is provided. The electronic device includes a processor and a memory coupled to the processor and having instructions stored therein, wherein the instructions, when executed by the processor, cause the device to execute actions. The actions include determining a first dependency relationship between a plurality of computing tasks included in a to-be-processed computing job. The actions further include determining, based on the first dependency relationship and demands of the plurality of computing tasks for computing resources, a group of computing tasks for combination from the plurality of computing tasks. The actions further include combining the group of computing tasks into a target computing task. The actions further include determining, based on the first dependency relationship, a second dependency relationship between the target computing task and computing tasks that are other than the group of computing tasks in the plurality of computing tasks.

In a third aspect of the present disclosure, a computer program product is provided. The computer program product is tangibly stored on a computer-readable medium and includes machine-executable instructions. The machine-executable instructions, when executed, cause a machine to execute the method according to the first aspect.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same components. In the accompanying drawings:

FIG. 7A shows a schematic diagram of a list of computing tasks before combination according to some embodiments of the present disclosure;

FIG. 7B shows a schematic diagram of a list of computing tasks after combination according to some embodiments of the present disclosure.

DETAILED DESCRIPTION

Figure 1:
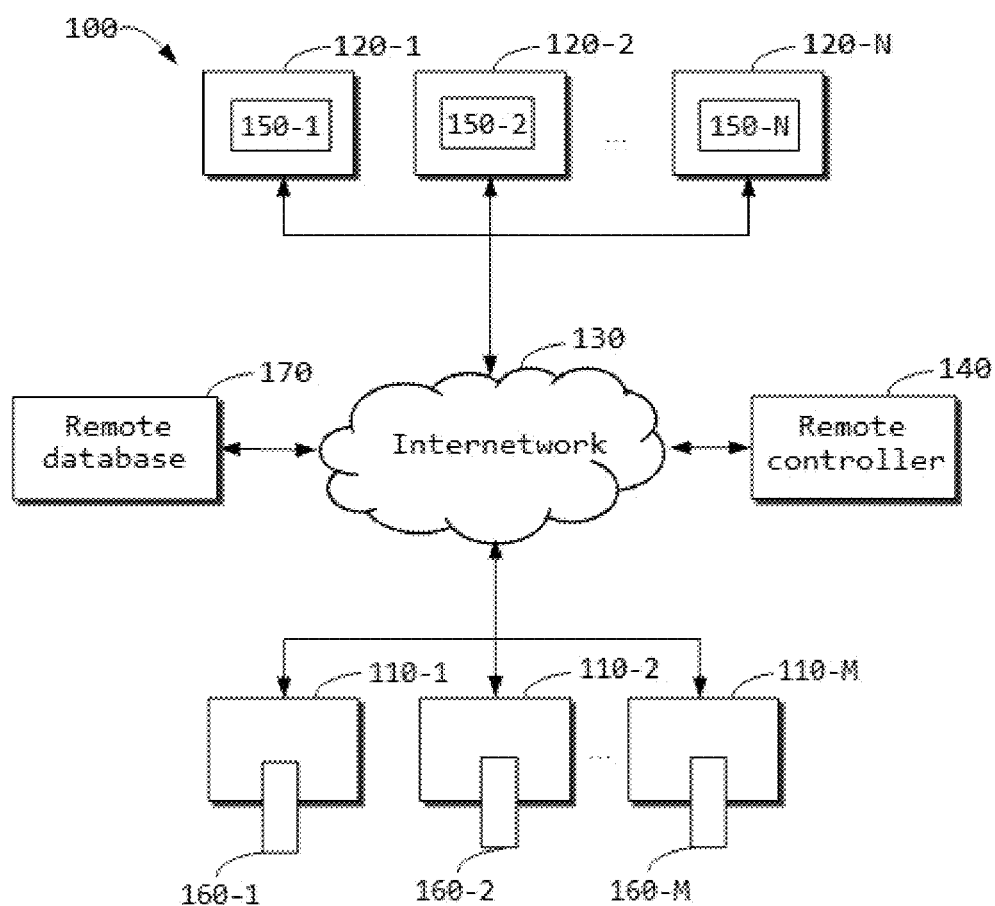
FIG. 1 shows a schematic diagram of a computing system in which embodiments of the present disclosure may be implemented.

The principles of the present disclosure will be described below with reference to some example embodiments shown in the accompanying drawings. Although example embodiments of the present disclosure are shown in the accompanying drawings, it should be understood that these embodiments are described merely to enable those skilled in the art to better understand and then implement the present disclosure, and are not intended to impose any limitation on the scope of the present disclosure.

The term "including" and variants thereof used herein indicate open-ended inclusion, i.e., "including, but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

For ease of description, various example implementations of the present disclosure will be described in an application environment of artificial intelligence technologies in the context of the present disclosure. In the field of artificial intelligence, a computing job may be processed using resources (e.g., computing resources and memory resources) of a dedicated processing unit (e.g., a graphics processing unit (GPU)).

In order to better understand the solution for processing a computing job according to the present disclosure, an architecture for processing an artificial intelligence-based computing job is first described. An artificial intelligence-based computing job is essentially a program which may include one or more functions implemented by a code segment. Similar to the execution of an ordinary program, when executing an artificial intelligence-based computing job, it is necessary to compile the program using a compiler. In the design and implementation of a modern compiler, a compiler (e.g., GCC and LLVM) for an ordinary program (e.g., C/C++ or FORTRAN) is usually divided into two parts: a frontend and a backend. The frontend takes a source program as an input and converts it into a hardware-independent intermediate representation. The intermediate representation is another program that is compiled in another language used inside the compiler, but it is easy to optimize and easy to convert into machine code. Then, the backend compiles and optimizes the intermediate representation program into a binary executable file that contains code of a machine (e.g., X86, Power, or ARM) of a target central processing unit.

For artificial intelligence development, an artificial intelligence development framework usually consists of a frontend and a backend. The frontend is used for providing programmers with a group of application program interfaces (APIs) which are usually defined in an easier programming language (e.g., Python). The application program interfaces define available data types, such as tensors and arrays, and the following methods: how to define different layers, such as an input layer, an output layer, and a hidden layer, and operations on each hidden layer; how to construct a whole neural network by connecting different layers; a classifier function, and the like. The backend is usually implemented in a more efficient language (e.g., C or C++). The backend needs to implement all data types and methods defined in the application program interfaces. At runtime, the frontend is linked to the backend via Python C/C++ extension or a dynamic link library compiled from the backend.

A compiler supporting an artificial intelligence program may be embedded in an artificial intelligence framework or may be a stand-alone executable file. Similar to an ordinary program compiler, a compiler supporting an artificial intelligence program includes a frontend and a backend. In the compiler supporting an artificial intelligence program, the intermediate representation that compiles the computing job and is outputted from the frontend is usually a computation graph, rather than an intermediate representation program. A vertex (or node) of the computation graph defines a computation (often referred to as a kernel) in a neural network, and an edge between two vertexes defines a dependency between two kernels. Generally, the compiler can perform some optimization on the computation graph, e.g., fusing some vertexes into one, and so on.

Code generated by the compiler's backend includes two portions, namely, host code and device code. The host code will be compiled by an ordinary compiler (e.g., GCC or LLVM) into a central processing unit-executable file. Identical to an executable file in an ordinary program, this executable file runs in a central processing unit and a main memory of a host computer. The host code is used for scheduling and coordination of kernel functions running in a dedicated processing unit device. The device code is generated for a target device, and will be compiled into a library by a vendor-specific compiler. The generated library will run in a target device attached to a host.

For example, if the target device is a dedicated processing unit of NVIDIA, then the device code may be C/C++ code or PTX code of Compute Unified Device Architecture (CUDA) kernel functions, where each kernel function corresponds to a kernel operation defined in an intermediate representation computation graph. This code will be compiled by a vendor-specific compiler (e.g., NVIDIA CUDA Compiler or NVCC). The device code is implemented as a library and is to be invoked by the host code.

A typical workflow of the host code may include: initializing a target dedicated processing unit device; reading a computation graph of an intermediate representation; selecting, for each computation vertex in a path of the computation graph, a corresponding CUDA kernel function from a device code library for implementation, allocating a memory for an input and an output of a kernel function, executing allocation of a work space memory for the kernel function, copying an input parameter of the kernel function from a central processing unit to the dedicated processing unit, invoking the kernel function, executing the kernel function in the dedicated processing unit, copying the output of the kernel function from the dedicated processing unit back to the central processing unit, releasing the target dedicated processing unit device, outputting a computing result, and so on.

As mentioned above, different computing jobs involve different computing workloads, such that different quantities of computing resources are required. For example, one computing job may require hundreds of megabytes (MBs) of memory resources and thousands of threads, while another computing job may require only tens of MBs of memory resources and hundreds of threads.

At present, resource-based model-partitioned scheduling has been presented. In the presented model parallel scheduling solution, load balancing among a plurality of tasks in different service levels is supported based on an intermediate representation (e.g., the computation graph) and a resource demand of each partition. However, it is difficult to balance partition results directly from the intermediate representation among computing devices, because loads of different partitions are greatly unbalanced in terms of memory and thread demands thereof. In addition, optimizing model parallel scheduling based on a tiling technology is also presented. For example, a computing task requiring a large quantity of GPU memories or a large quantity of GPU threads is divided into a plurality of sub-computing tasks using tiling scheduling optimization. Each generated sub-computing task only requires moderate GPU memories and threads.

Frequently seen in image processing and deep learning, fusion is a kind of very useful scheduling optimization that combines a plurality of computations into a single computation. Some convolutional neural network (CNN) models (e.g., Cifar-10) will fuse a convolutional layer and a rectified linear unit (RELU) layer into one layer in a network structure. In this case, there is only one computation in a resulting computation graph, and a single GPU CUDA function will implement both convolution and RELU computation. Some architectures (such as Halide, and XLA and TVM in TensorFlow) will support fusion optimization in compilers thereof.

Fusion optimization is used to combine different computations to improve the data movement performance. These computations are producers or consumers of the same data, such that all fusion computations may be executed at the same location without exchanging data between functions among computing nodes. Fusion is opposite to the tiling mentioned above: the tiling technology splits a single computation into a plurality of computations to increase the degree of concurrency, but this will increase the overheads of related data communication, while fusion combines a plurality of computations into one computation to increase data locality and reduce data movement, but this will also reduce the concurrency. The inventors of the present application have recognized that, for a well-designed computing system, it is necessary to maintain a balance between tiling and fusion.

However, the solution for tiling presented above is only to divide a computing task with a high resource demand into a plurality of sub-computing tasks with a moderate resource demand. In a computing job, some computing tasks (e.g., a computation function) may be very trivial. For example, both division and square root functions are implemented very concisely in a CUDA. However, a scheduler may schedule such two computing tasks to different computing nodes for execution. In this case, the data movement will dominate the processing of the computing job, which means that the overheads of transmitting parameters or other data from one computing task running in a GPU to another computing task running in another GPU or transmitting only from GPU to CPU will overwhelm the computations inside the GPU. Therefore, the inventors of the present application have recognized that it is necessary to combine or fuse such trivial computing tasks into a computing task with a moderate resource demand, thereby reducing the overheads of data movement.

Different computing tasks (e.g., kernel functions) have different demands for computing resources. Computing resources mentioned herein may include at least one of memory resources and thread resources. Generally, different computing tasks included in a computing job may be divided into four types based on demands for computing resources. The first type of computing tasks may require fewer memories (e.g., about a few MBs or fewer) and fewer threads (e.g., hundreds of threads or fewer); the second type of computing tasks may require more memories (e.g., tens of MBs or more) but fewer threads (e.g., hundreds of threads or fewer); the third type of computing tasks may require fewer memory DNAs (e.g., about a few MBs or fewer) but more threads (e.g., thousands of threads or more); and the fourth type of technical tasks may require more memories (e.g., tens of MBs or more) and more threads (e.g., thousands of threads or more). For this, it is possible to safely fuse the first type of computing tasks and safely tile the fourth type of computing tasks. However, if the second and third types of computing tasks are fused blindly, the computing performance will perhaps not be improved, and the computing performance may be further adversely impacted.

In some conventional solutions, computations in a neural network are blindly fused. For example, no matter where a convolutional layer and a RELU layer are in a network, some deep neural networks (DNNs) will blindly fuse the convolutional layer and the RELU layer. In such conventional solutions, such fusion in the last layer of the network will result in huge or burdensome computing workloads, and adversely impact the computing performance.

Some other conventional solutions do not support a dynamic fusion. For example, an architecture such as TensorFlow XLA can only support a fusion based on static rules. Since users usually do not know whether a particular fusion is suitable, they will not know whether this fusion will improve the performance or hinder the performance. Therefore, in this architecture, users usually ignore the fusion of computing.

Still some other solutions cannot determine the termination of a fusion as needed. Some architectures such as TVM will fuse as many computations as possible. In such conventional solutions, two problems will arise. One is that the concurrency of processing will be greatly impacted. For example, if a deep learning program is compiled using TVM, a generated computation graph is almost a list or sequence, rather than a graph. Such a list is very difficult to be parallelized since all computations in the list are directly interdependent. Another problem is that, after such a blind fusion, resulting computations will be very burdensome (requiring many threads) or huge (requiring many memories).

In order to at least partially solve the above problems and one or more of other potential problems, an embodiment of the present disclosure presents a technical solution for processing a computing job. The technical solution can, based on a dependency between computing tasks and demands of the computing tasks for computing resources, combine computing tasks involving a demand for fewer computing resources in a computing job. The combined computing task can be processed at the same computing node or computing device. In this way, it is possible to reduce data movement (e.g., movement between GPU and CPU or between different GPUs) and improve the computing performance.

In addition, the embodiments of the present disclosure also benefit the load balancing scheduling. The fusion of computing tasks with low resource demands can promote the load balancing among a plurality of computing devices or computing nodes. For example, the following situations can be avoided: some computing devices only process computing tasks with low resource demands and waste computing resources, while some other computing devices have resource constraints due to processing computing tasks with high resource demands. In particular, when the computing task fusion according to the embodiments of the present disclosure is combined with the above-mentioned computing task tiling so as for use in a computing system, load balancing scheduling can be achieved. Therefore, with the embodiments of the present disclosure, a computing job can be processed more efficiently.

For ease of description, various example implementations of the present disclosure will be described with a deep learning-based computing job as a specific example in the context of the present disclosure. It should be understood that, although details of example implementations of the present disclosure are described only with the deep learning-based computing job as an example herein, the example implementations of the present invention may be applicable to other jobs as well, such as other deep learning-based computing jobs, a high performance computing (HPC)-based computing job, a data mining-based computing job, and the like.

FIG. 1 schematically shows a block diagram of a computing system 100 in which embodiments of the present disclosure may be implemented. A plurality of servers 110-1, 110-2, . . . , and 110-M (hereinafter individually or collectively referred to as server 110 or servers 110, where M is a natural number greater than 1) is arranged in computing system 100. Computing system 100 further includes dedicated processing resource 160-1, dedicated processing resource 160-2, . . . , and dedicated processing resource 160-M (hereinafter individually or collectively referred to as dedicated processing resource 160 or dedicated processing resources 160, where M is a natural number greater than 1). Each server 110 has one or more dedicated processing resources 160. Such a dedicated processing resource cluster or pool including a plurality of dedicated processing resources 160 is dynamic and shared.

In the example of FIG. 1, server 110-1 has dedicated processing resource 160-1, server 110-2 has dedicated processing resource 160-2, and server 110-M has dedicated processing resource 160-M. Examples of dedicated processing resource 160 may include, but are not limited to, a graphics processing unit, a field programmable gate array (FPGA), and the like. For ease of discussion, some example implementations will be described with the graphics processing unit as an example of dedicated processing resource 160. Besides dedicated processing resource 160, server 110 may further include one or more general-purpose processing units (not shown) such as a central processing unit.

FIG. 1 further shows a plurality of client terminals 120-1, 120-2, . . ., 120-N, and the like (hereinafter individually or collectively referred to as client terminal 120 or client terminals 120, where N is a natural number greater than 1), which respectively have to-be-run applications 150-1, 150-2, . . . , and 150-N (hereinafter individually or collectively referred to as application 150 or applications 150, where N is a natural number greater than 1). Application 150 may be any application that may run on a machine. The application may be designed to execute a job, such as corresponding data processing or analysis. As an example, application 150 may execute computing jobs related to deep learning, machine learning or high-performance computing, artificial intelligence, and the like In order to run application 150 quickly and efficiently, client terminal 120 may request dedicated processing resource 160 of server 110 to run these applications 150. In such an implementation, client terminal 120 may be connected to one or more servers 110 via internetwork 130, and hand over application 150 to one or more dedicated processing resources 160 of server 110 for running. Depending on interfaces supported by client terminal 120, server 110, and/or dedicated processing resource 160, internetwork 130 can support different types of wired or wireless connections based on various network transmission technologies such as remote direct memory access (RDMA) and transmission control protocol (TCP).

It should be understood that the devices and/or arrangement shown in FIG. 1 are merely an example. In other examples, computing system 100 may include any appropriate number of servers 110 and client terminals 120. Each server 110 may be provided with any appropriate number of dedicated processing resources 160, and each client terminal 120 may have a plurality of to-be-run applications 150. In addition, computing system 100 further includes remote controller 140 and remote database 170.

Remote controller 140 may allocate dedicated processing resource 160 to client terminal 120 based on a resource quantity of dedicated processing resources requested by client terminal 120 and available dedicated processing resources in computing system 100. Then, client terminal 120 may request allocated dedicated processing resource 160 from dedicated processing resource server 110. Remote database 170 can communicate with client terminal 120 and remote controller 140 via internetwork 130. Remote database 170 can store metadata extracted by client terminal 120 when compiling application 150, and the metadata can be acquired by remote controller 140. It should be understood that although controller 140 and remote database 170 shown in FIG. 1 are separated, the two may also be implemented on the same device.

For clarity and conciseness of description, example embodiments of the present disclosure will be described in detail mainly with a graphics processing unit as an example of dedicated processing resource 160. As is known, as a special-purpose processor, a graphics processing unit's powerful computing power comes from its large number of cores and high bandwidth memory. In a hardware architecture of a graphics processing unit, the graphics processing unit usually has a large number of graphics processing unit kernels, for example, several thousand or nearly ten thousand kernels.

However, it should be understood that the graphics processing unit is merely an example dedicated processing resource 160 and is not intended to limit the scope of the present disclosure. The spirit and principles described herein can be applied to other dedicated processing resources which are, e.g., processing resources in accelerators such as field programmable gate arrays, whether currently known or to be developed in the future, and are not just limited to graphics processing unit kernels.

Figure 2:
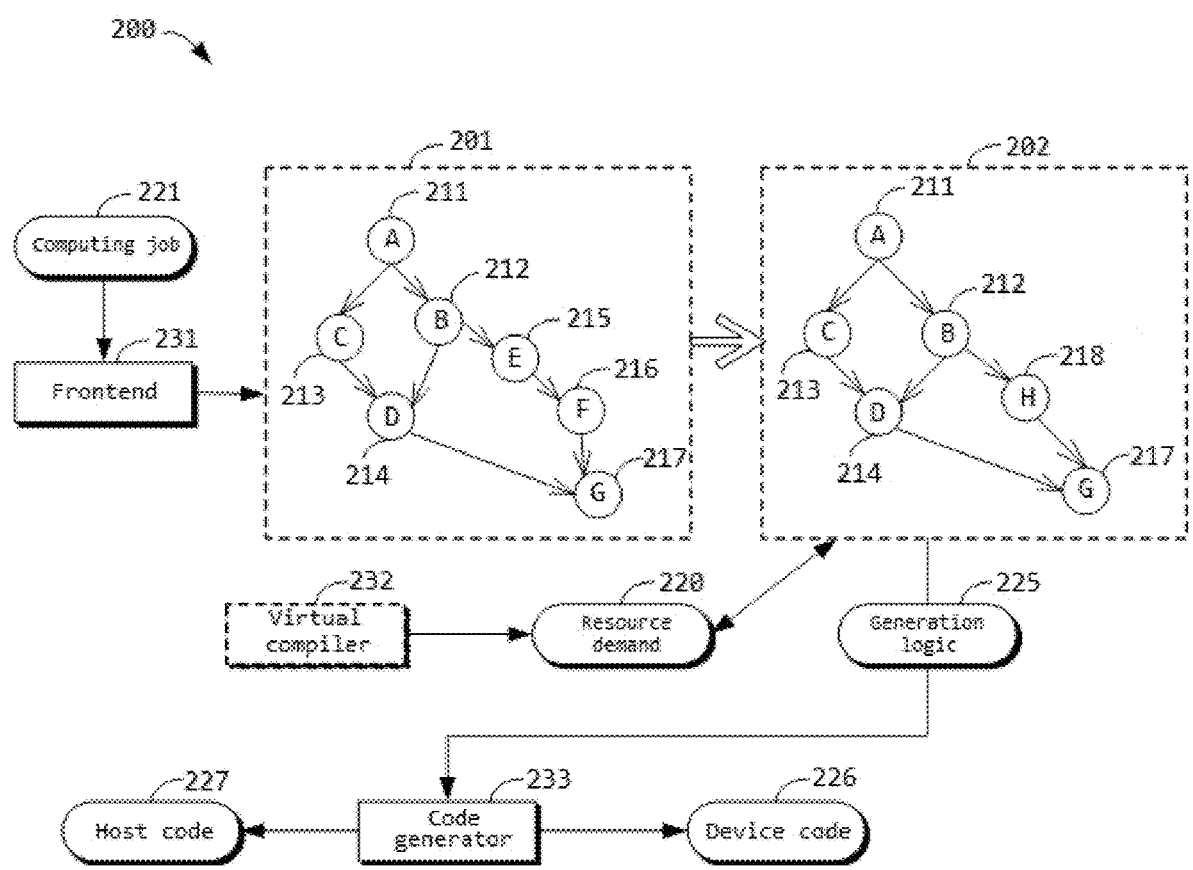
FIG. 2 shows a schematic block diagram of an architecture for processing a computing job according to an embodiment of the present disclosure.

A summary of the embodiments of the present disclosure is described below first with reference to FIG. 2. FIG. 2 shows schematic block diagram 200 of an architecture for processing a computing job according to an embodiment of the present disclosure. As shown in FIG. 2, computing job 221 (e.g., a DL program) is inputted into a compiler of a computing system, e.g., an open source-based deep learning compiler such as TensorFlow, PyTorch, or TVM. Frontend 231 of the compiler compiles computing job 221 and outputs an intermediate representation of computing job 221. The intermediate representation may indicate dependencies between various computing tasks included in computing job 221. In the example of FIG. 2, the intermediate representation of computing job 221 is illustrated as computation graph 201, while it should be understood that this is merely illustrative and is not intended to be limiting. Various vertexes A-G in computation graph 201 correspond to computing tasks 211-217 of computing job 221, respectively. Edges of computation graph 201 indicate the dependencies between the computing tasks. For example, computing task 213 depends on computing task 211.

According to an embodiment of the present disclosure, a concept of resource demand 220 is presented. Demands of computing tasks 211-217 for computing resources can be obtained, i.e., indicated by resource demand 220. In some embodiments, resource demand 220 may be obtained using virtual compiler 232. The demand for computing resources may include a demand for memory resources and a demand for thread resources. For example, resource demand 220 may include a memory space (e.g., how many MBs) and the number of threads required by an individual computing task of computing tasks 211-217.

Based on resource demand 220 and the dependencies between computing tasks 211-217, some computing tasks are combined or fused. Then, computation graph 201 may be updated to computation graph 202. In this example, vertex E and vertex F are fused into new vertex H. Accordingly, computing task 215 and computing task 216 are combined into computing task 218.

At backend code generator 233, there may be no code generation logic corresponding to combined computing task 218. In some embodiments, at the frontend, code generation logic 225 corresponding to combined computing task 218 will also be generated and code generation logic 225 will be provided to backend code generator 233. Further, code generator 233 can generate host code 227 and device code 226 that correspond to computation graph 202 for processing computing job 221.

Figure 3:
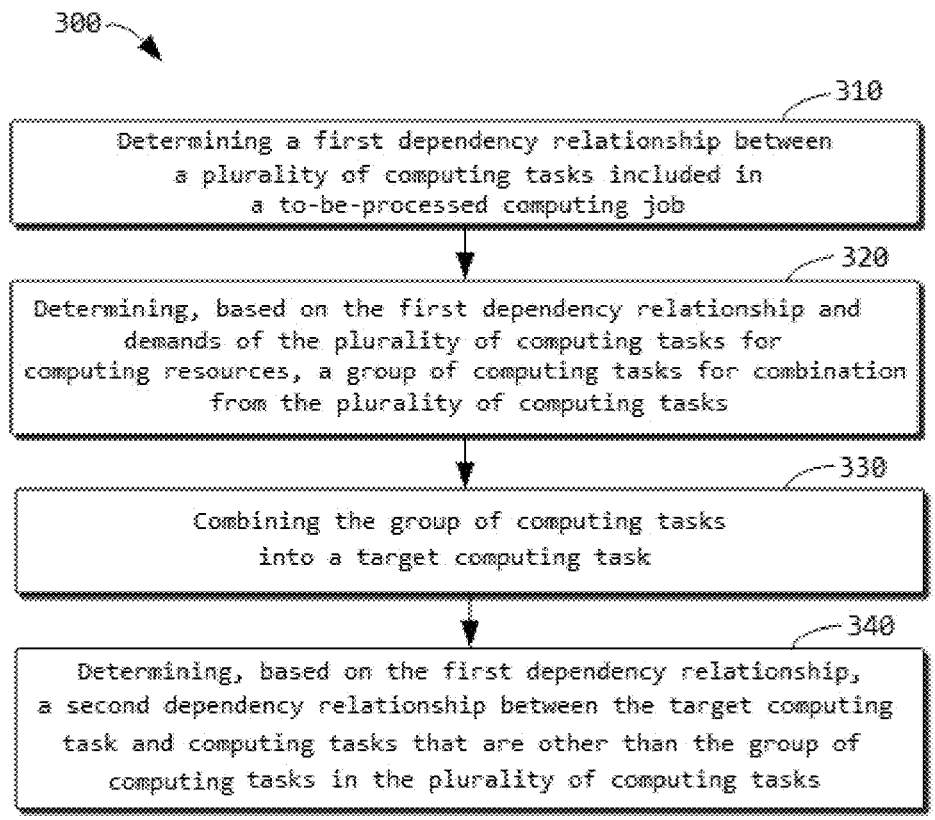
FIG. 3 shows a flowchart of a process of processing a computing job according to some embodiments of the present disclosure.

More details of embodiments of the present disclosure will be described below with reference to FIG. 3. FIG. 3 shows a flowchart of process 300 of processing a computing job according to some embodiments of the present disclosure. To facilitate discussion, process 300 is described in conjunction with FIG. 2.

In block 310, a dependency relationship (which may also be referred to as a first dependency relationship herein) between a plurality of computing tasks included in a to-be-processed computing job 221 is determined. The "plurality of computing tasks" described herein may refer to all computing tasks included in computing job 221, or may refer to some of the computing tasks included in computing job 221. In other words, a fusion mechanism of the present disclosure can be applied to all or some of the computing tasks of computing job 221. In the following description, although the embodiments of the present disclosure are described with computing tasks 211-217 as an example of the plurality of computing tasks, it should be understood that this is merely illustrative.

In some embodiments, a computation graph representing computing job 221 may be obtained, and the first dependency relationship may be determined from the computation graph. For example, as shown in FIG. 2, computation graph 201 outputted by frontend 231 of the compiler may be obtained. The computation graph indicates the dependency relationship between computing tasks 211-217. In some embodiments, the dependency relationship between computing tasks 211-217 may also be determined from other types of intermediate representations (e.g., an intermediate representation program) of computing job 221.

In block 320, based on the first dependency relationship and demands of the plurality of computing tasks 211-217 for computing resources, a group of computing tasks for combination is determined from the plurality of computing tasks 211-217. It will be understood that, different from the blind fusion in conventional solutions mentioned above, in the embodiments of the present disclosure, two criteria, namely, a dependency relationship criterion and a resource demand criterion, are applied to determine a computing task suitable for combination.

A criterion related to dependency relationship (also referred to as the dependency relationship criterion) can facilitate the selection of a computing task that is more suitable for combination from the perspective of computational implementation. This ensures that a combined computing task is not too complex. For example, in order to apply the criterion related to dependency relationship, an output degree and an input degree of a computing task may be defined. For a computing task, the output degree may refer to the number of other computing tasks that depend on the computing task in a computing job, and the input degree may refer to the number of other computing tasks on which the computing task depends in a computing job. A computing task with the output degree or the input degree greater than or equal to a threshold may be determined as a computing task unsuitable for combination, and thus will be removed from a candidate task set or will not be added to the candidate task set.

Reference is now made to computation graph 201 shown in FIG. 1. The number of arrows pointing to a vertex may indicate the input degree of a computing task corresponding to the vertex, and the number of arrows pointing away from the vertex may indicate the output degree of the computing task corresponding to the vertex. For example, computing task 214 corresponding to vertex D has an input degree of 2 and an output degree of 1.

In some embodiments, the threshold for the input degree and/or the output degree may be set as 2. In such an embodiment, the combined computing task and the dependency relationship between the combined computing task and other computing tasks can be determined in the simplest way. In the example of FIG. 1, the input degree of computing task 214 is 2, equal to threshold 2. Therefore, computing task 214 may be determined as a computing task unsuitable for combination. Similarly, the output degree of computing task 212 is 2, equal to threshold 2. Therefore, computing task 212 may be determined as a computing task unsuitable for combination. Computing tasks 215 and 216, each with an input degree of 1 (less than threshold 2) and an output degree of 1 (less than threshold 2), are computing tasks suitable for combination. It should be understood that the dependency relationship between the computing tasks shown in computation graph 201 in FIG. 1 is merely illustrative.

A criterion related to resource demand (also referred to as the resource demand criterion) can facilitate the selection of a computing task that is more suitable for combination from the perspective of computational load. This can avoid combination of a burdensome or huge computing task with another computing task, which produces an undesirable computing task that is even more burdensome or huge.

A demand of a computing task for computing resources may be obtained in a variety of ways. For example, the resource demand may be determined with a compiler. Computing tasks 211-217 may include a program compiled in a programming language, can use a real compiler to execute compilation and obtain an executable program, and can read overheads of various computing resources (e.g., memory resources and thread resources) during running of the executable program.

For another example, the resource demand may be determined in a virtual way. An operation of the real compiler can be modified to obtain a virtual program (e.g., virtual compiler 232 shown in FIG. 1). The virtual program does not include a command related to computing resource allocation and release, but only records data related to computing resource allocation and release. In this way, a resource demand of each computing task of computing tasks 211-217 may be obtained without actually executing computing tasks 211-217.

The demand for computing resources may include at least one of a demand for memory resources and a demand for thread resources. It can be determined based on the actual resource amount of the computing system which type or types of resource demands are used to determine a computing task suitable for combination. A computing task with a demand for computing resources exceeding a threshold (which is also referred to as a first threshold herein) will be determined as a computing task unsuitable for combination, and thus will be removed from a candidate task set for combination or will not be added to the candidate task set.

In some embodiments, each of the plurality of computing tasks 211-217 may be traversed to determine whether a corresponding computing task meets the dependency relationship criterion and the resource demand criterion described above, and a computing task that meets the two criteria is added to the candidate task set, or a computing task that does not meet either criterion is removed from the candidate task set. In some embodiments, a computing task suitable for combination may be determined from the plurality of computing tasks 211-217 first based on the resource demand and then based on the dependency relationship. For example, a computing task that meets the resource demand criterion may be first added to the candidate task set, and then a computing task that does not meet the dependency relationship criterion may be removed from the candidate task set.

Figure 4:
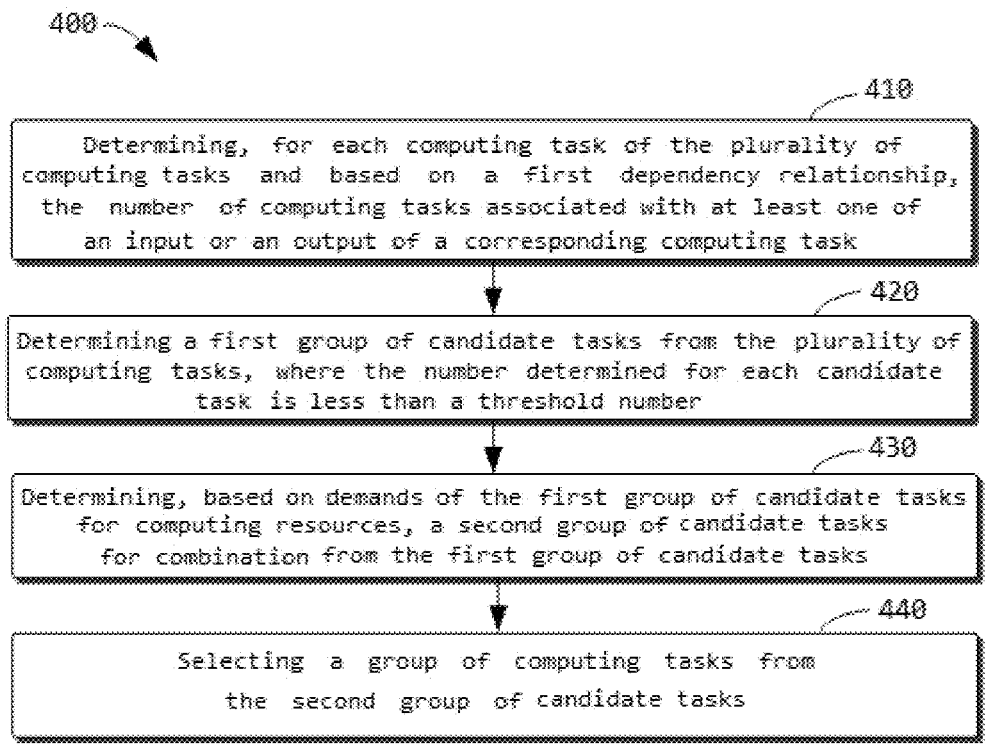
FIG. 4 shows a flowchart of a process of determining a computing task for combination according to some embodiments of the present disclosure.

In some embodiments, a computing task suitable for combination may be determined from the plurality of computing tasks 211-217 first based on the dependency relationship and then based on the resource demand. An example of such an embodiment is described below with reference to FIG. 4. FIG. 4 shows a flowchart of process 400 of determining a computing task for combination according to some embodiments of the present disclosure. Process 400 may be considered as a specific implementation of block 320.

In block 410, for each computing task of the plurality of computing tasks 211-217 and based on a first dependency relationship, the number of computing tasks associated with at least one of an input or an output of a corresponding computing task is determined. For example, an output degree and an input degree of each vertex of vertexes A-G can be determined from computation graph 201.

In block 420, a first group of candidate tasks is determined from the plurality of computing tasks 211-217. The number determined for each candidate task is less than a threshold number. For example, computing tasks with both an input degree and an output degree less than a threshold among the plurality of computing tasks 211-217 are determined as the first group of candidate tasks, which may also be referred to as an initial candidate task set herein.

For example, the plurality of computing tasks of computing job 221 may be used as an initial set, and then the output degree and the input degree are computed for each computing task in the initial set. A computing task with one of the output degree and the input degree greater than or equal to the threshold number will be removed from the initial set. The computing task set thus obtained is the initial candidate task set. For the example in FIG. 2, the initial candidate task set or the first group of candidate tasks will include computing tasks 215 and 216.

In an embodiment where the first dependency relationship is determined based on the computation graph, various vertexes in the computation graph may be used as the initial set, and then the output degree and the input degree of each vertex may be computed. A vertex with one of the output degree and the input degree greater than or equal to the threshold number will be removed from the computation graph. At the same time, the removed vertex will be saved in another set or list for use in determining a fused computation graph.

Figure 5A:
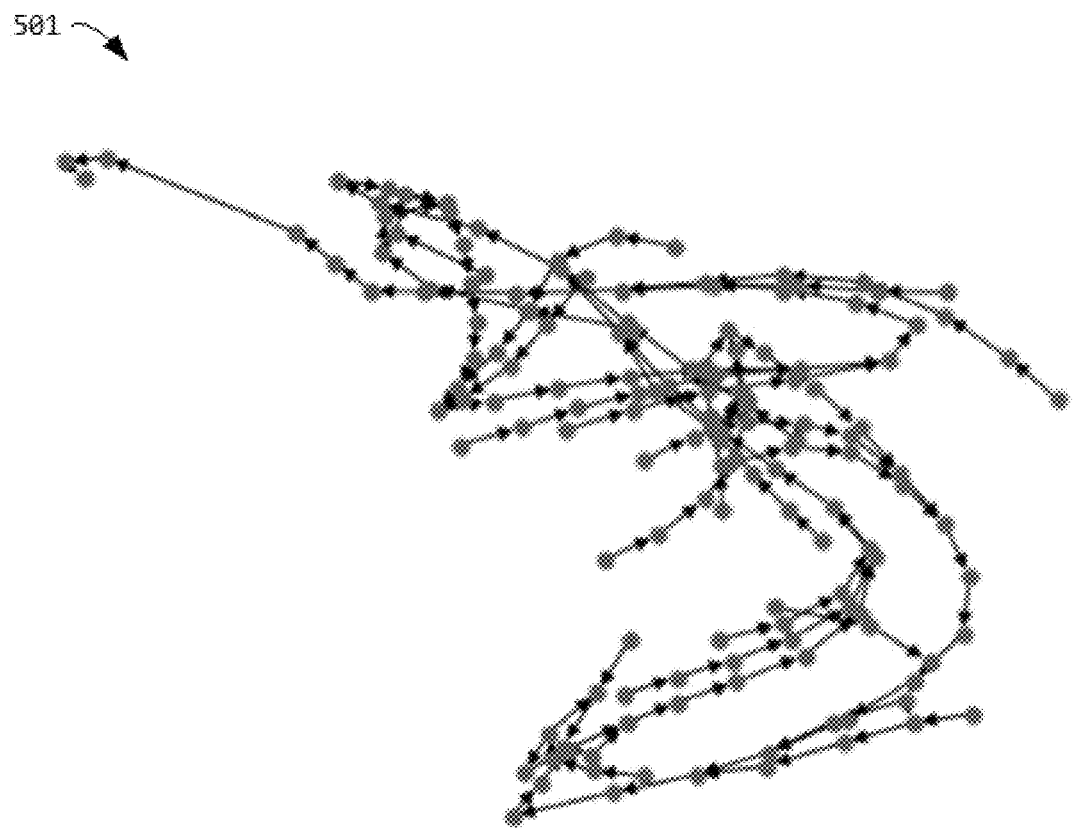
FIG. 5A shows a schematic diagram of an original computation graph according to some embodiments of the present disclosure.
Figure 5B:
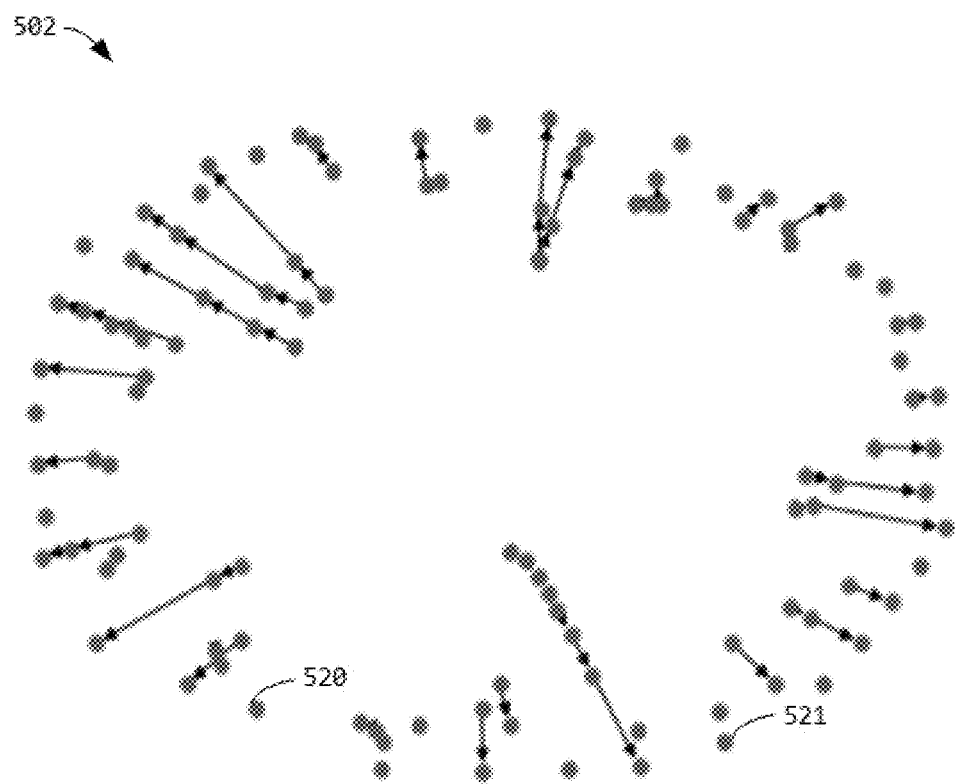
FIG. 5B shows a schematic diagram of a computation graph with some vertexes removed according to some embodiments of the present disclosure.

FIG. 5A and FIG. 5B describe such an example. FIG. 5A shows a schematic diagram of original computation graph 501 according to some embodiments of the present disclosure. Original computation graph 501 includes many vertexes. Each vertex corresponds to a computing task. FIG. 5B shows a schematic diagram of computation graph 502 with some vertexes removed according to some embodiments of the present disclosure. Computation graph 502 only includes vertexes (i.e., corresponding computing tasks) that meet the dependency relationship criterion. Computing tasks corresponding to the vertexes in computation graph 502 may be an initial candidate set.

Still referring to FIG. 4, in block 430, based on demands of the first group of candidate tasks for computing resources, a second group of candidate tasks for combination is determined from the first group of candidate tasks. If there is a candidate task with a demand for computing resources exceeding the first threshold mentioned above in the first group of candidate tasks, such a candidate task may be removed from the first group of candidate tasks to determine the second group of candidate tasks. If the demand of each candidate task in the first group of candidate tasks for computing resources is less than the first threshold, no candidate task will be removed from the first group of candidate tasks. In this case, all candidate tasks in the first group of candidate tasks may be determined as the second group of candidate tasks. Still referring to the example in FIG. 2, the first group of candidate tasks includes computing tasks 215 and 216. In the case where resource demand 220 indicates that the demands of computing tasks 215 and 216 for memory resources and thread resources are both less than a corresponding threshold, computing tasks 215 and 216 will be determined as the second group of candidate tasks.

It should be understood that the demand for computing resources described here may include a demand for memory resources and a demand for thread resources. Accordingly, the first threshold may include a threshold for memory resources and a threshold for thread resources. Therefore, each candidate task in the second group of candidate tasks meets both the dependency relationship criterion and the resource demand criterion.

As an example, each candidate task in the initial candidate task set may be traversed to view whether the demand of the candidate task for computing resources exceeds the first threshold. A candidate task with a demand for either of memory resources and thread resources exceeding the corresponding threshold will be removed from the initial candidate set. In this way, an updated candidate task set can be obtained, that is, the second group of candidate tasks.

There may be an orphan computing task in the initial candidate task set and the updated candidate task set. The orphan computing task is independent of any other computing tasks in the candidate task set. In other words, the orphan computing task does not depend on any other computing tasks in the candidate task set, and no computing tasks in the candidate task set depend on the orphan computing task. In some embodiments, the orphan computing task may be removed from the initial candidate task set (i.e., the first group of candidate tasks). Alternatively or additionally, the orphan computing task may also be removed from the updated candidate task set (i.e., the second group of candidate tasks).

Figure 5C:
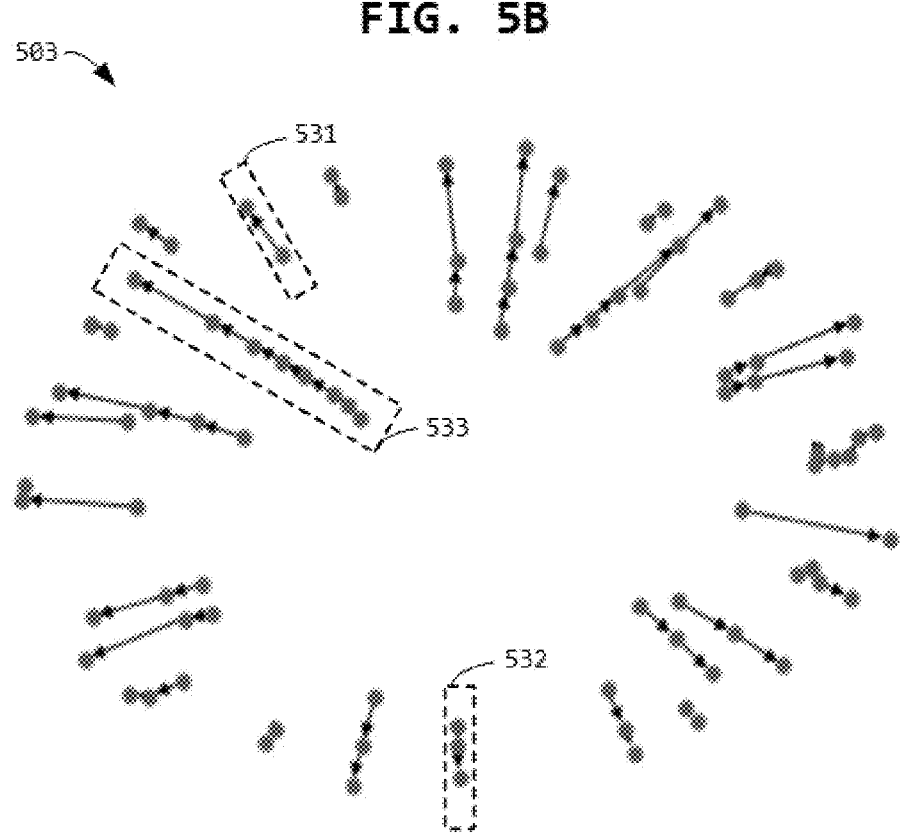
FIG. 5C shows a schematic diagram of a computation graph with an orphan vertex removed according to some embodiments of the present disclosure.

Accordingly, when a candidate task is determined by removing a vertex in the computation graph, there may be an orphan vertex in the computation graph with some vertexes removed. In the computation graph, no edges point to the orphan vertex or point away from the orphan vertex. Referring to FIG. 5B, a plurality of orphan vertexes are included, e.g., orphan vertexes 520 and 521. In the computation graph with some vertexes removed, a vertex with an output degree and an input degree both being 0 is an orphan vertex. FIG. 5C shows a schematic diagram of computation graph 503 with an orphan vertex removed according to some embodiments of the present disclosure. In computation graph 503, each vertex is associated with at least one of other vertexes.

Still referring to FIG. 4, in block 440, a group of computing tasks for combination is selected from the second group of candidate tasks. In some embodiments, a plurality of groups of computing tasks may be combined. Referring to FIG. 5C, computing task sequences 531, 532, and 533 are shown. In such a computing task sequence or link, a plurality of computing tasks sequentially depend on last computing tasks. In the case where only a computing task with the output degree and the input degree less than 2 is allowed to be combined, such a computing task sequence may correspond to a sub-graph in a computation graph and will be a potential object to be combined or fused.

Figure 6:
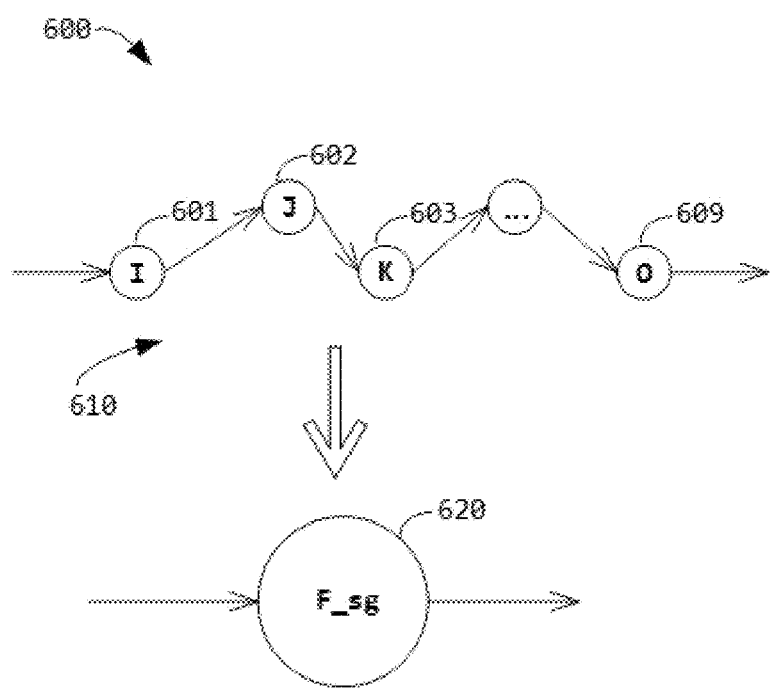
FIG. 6 shows a schematic diagram of a computing task sequence and a subgraph according to some embodiments of the present disclosure.

Referring to FIG. 6, schematic diagram 600 of computing task sequence 610 according to some embodiments of the present disclosure is shown. Computing task sequence 610 may be a part of a second group of candidate tasks or an updated candidate task set, and may be a potential object to be combined or fused. Computing task sequence 610 starts with computing task 601 corresponding to vertex I, and ends with computing task 609 corresponding to vertex O. In computing sequence 610, except for computing task 601 as a start, other computing tasks sequentially depend on last computing tasks.

In some embodiments, when determining a finally combined computing task from a candidate task set, a demand of the combined computing task for computing resources may be further considered. For example, a fusion algorithm may start with computing task 601, and fuse as many computing tasks as possible, until a fused computing task may exceed a second threshold of the computing resource. The second threshold described herein may be identical to or different from the above mentioned first threshold for determining a candidate task. Therefore, it is necessary to estimate the demand of the fused computing task for computing resources. Such an embodiment is described below with reference to FIG. 6.

In some embodiments, in order to determine the finally combined computing task, a first candidate task and a second candidate task in the second group of candidate tasks may be first determined based on a first dependency relationship. The first candidate task does not depend on other candidate tasks in the second group of candidate tasks, and the second candidate task depends on the first candidate task. Then, a first demand of a first combined task that combines the first candidate task and the second candidate task for computing resources may be estimated. If the estimated first demand is less than a second threshold, the first candidate task and the second candidate task are selected as at least a part of the group of computing tasks for combination.

In some embodiments, if the second group of candidate tasks includes a third candidate task depending on the second candidate task, a second demand of a second combined task that combines the first combined task and the third candidate task for computing resources is estimated. If the estimated second demand is less than the second threshold, the third candidate task is added into a finally combined group of computing tasks. If a third candidate task depending on the second candidate task is not included in the second group of candidate tasks, the first candidate task and the second candidate task are determined as the finally combined group of computing tasks.

Such an example process is described with reference to FIG. 6. Computing task 601 as the start of computing sequence 610 and computing task 602 (corresponding to vertex J in FIG. 6) depending on computing task 601 are determined from the updated candidate task set. For example, in an implementation using a computation graph, vertex I (e.g., at a header of a list) is first found, and then vertex J as a neighbor of vertex I is found. Then, the demand of a first combined task that combines computing task 601 and computing task 602 for computing resources (including memory resources and/or thread resources) may be estimated using, e.g., an experimental algorithm. If the estimated demand is less than the second threshold, computing task 601 and computing task 602 may be used as at least a part of the finally combined group of computing tasks. Accordingly, in the implementation using the computation graph, vertex I and vertex J will be fused into a new vertex (which may be referred to as a first fusion vertex), while vertex I and vertex J will be removed. In addition, an edge will be added between the new vertex and vertex K, where vertex K is a neighbor of vertex J. In other words, vertex I and vertex J will be replaced by the new vertex.

The process continues, and whether there is a computing task depending on computing task 602 in the candidate task set may be determined. If there is no computing task depending on computing task 602, computing task 601 and computing task 602 will be used as the finally combined group of computing tasks. In the example of FIG. 6, computing task 603 depending on computing task 602 may be determined. That is, vertex K as a neighbor of vertex J is found. Then, the demand of the second combined task that combines the first combined task and computing task 603 for computing resources may be estimated. If the estimated demand is less than the second threshold, computing task 603 will also be determined as one computing task in the finally combined group of computing tasks. Accordingly, in the implementation using the computation graph, vertex K and the above mentioned first fusion vertex will be fused into a second fusion vertex, and vertex K will be removed. If the estimated demand exceeds the second threshold, computing task 603 will not be combined with computing tasks 601 and 602. Computing tasks 601 and 602 will be used as a group of computing tasks for combination. At the same time, the next group of computing tasks to be combined together is determined from computing task sequence 610 with computing task 603 as a start. In this way, the computing tasks in computing task sequence 610 are searched to determine one or more groups of computing tasks for combination until the last computing task 609, i.e., vertex O without a neighbor in an output direction, is searched for.

As can be seen from the above description, the computing tasks in computing task sequence 610 may include one or more groups of computing tasks to be combined, and may also include uncombined computing tasks. In this case, fused vertex F_sg 620 corresponding to computing task sequence 610 may be its own Kleene closure. Vertex F_sg 620 may include one or more subgraphs, one or more computation vertexes (corresponding to the combined computing tasks or computing tasks failing to be combined with other tasks), and any combination thereof.

An example process of determining at least one group of computing tasks for combination from a plurality of computing tasks is described above with reference to FIG. 4, FIG. 5, and FIG. 6. Still referring to FIG. 3, in block 330, the group of computing tasks is combined into a target computing task. For example, in the example of FIG. 6, if computing tasks 601-603 are determined as used for combination, a combination of computing tasks 601-603 may be generated as the target computing task.

Since the combined computing task, i.e., the target computing task, is new and unfamiliar to a compiler, code generator 233 at the backend of the compiler may not have a code generation logic for the target computing task. In some embodiments, the code generation logic for the target computing task may be generated and provided (e.g., to code generator 233) based on how to combine into the target computing task. For example, a group of generation logics corresponding to the group of combined computing tasks may be obtained. Each generation logic in the group of generation logics is used for generating an executable instruction for a corresponding computing task. The group of generation logics is combined into a target logic, e.g., generation logic 225 shown in FIG. 2, for generating an executable instruction for the target computing task. The target logic may be further provided to code generator 233, as shown in FIG. 2.

Reference is now made to FIG. 7A and FIG. 7B. FIG. 7A shows a schematic diagram of list 701 of computing tasks before combination according to some embodiments of the present disclosure, and FIG. 7B shows a schematic diagram of list 702 of computing tasks after combination according to some embodiments of the present disclosure. In lists 701 and 702, the first column indicates a computing task number, the second column indicates a computing task identifier, the third column indicates a demand (in a unit of MB) of a computing task for memory resources, and the fourth column indicates a demand (in a unit of the number of threads) of a computing task for thread resources.

Merely as an example, list 701 may include a computing task that meets a dependency relationship criterion and a resource demand criterion and is determined from a plurality of computing tasks of a computing job. For example, in the process described above with reference to FIG. 6, computing tasks 711 and 712 are determined as a group of combined computing tasks. Computing task 711 with an identifier fused_sqrt may represent a square root function, and computing task 712 with an identifier fused_divide may represent a division function. Referring to FIG. 7B, in list 702 of combined computing tasks, neither of computing tasks 711 and 712 exists. Alternatively, computing task 720 with an identifier fused_test_sqrt_divide is added into list 702 as a combined computing task (i.e., a target computing task). Accordingly, a code generation logic for combined computing task 720 may be generated based on code generation logics for computing tasks 711 and 712 (which are the square root function and the division function in this example).

Still referring to FIG. 3, in block 340, a second dependency relationship (which may also be referred to as a dependency relationship after combination) between the target computing task and computing tasks that are other than the group of computing tasks in the plurality of computing tasks is determined based on the first dependency relationship. For example, updated computation graph 202 can be determined. In the example of FIG. 2, combined computing task 218 will depend on uncombined computing task 212, and uncombined computing task 217 will depend on combined computing task 218. At the same time, a computing task removed from the candidate task set will maintain its original dependency relationship. Accordingly, in updated computation graph 202, the output of fused vertex H will be associated with original vertex G, and the input of the fused vertex H will be associated with original vertex B.

The dependency relationship after combination (e.g., computation graph 202) and generation logic 225 for the combined computing task may be provided to backend code generator 233. Further, code generator 233 can generate host code 227 and device code 226 that correspond to computation graph 202 for processing computing job 221. The processing result is the same as the processing result without computing task combination. Thus, in the process of processing computing job 221, a group of computing tasks combined into a single computing task will be processed at the same computing node, thereby avoiding data movement.

The technical solution of combining computing tasks according to embodiments of the present disclosure is described above. The technical solution can determine, based on a dependency between computing tasks and demands of the computing tasks for computing resources, computing tasks suitable for combination from computing tasks of a computing job. The combined computing task can be processed at the same computing node or computing device. In this way, it is possible to reduce data movement (e.g., movement between GPU and CPU or between different GPUs) and improve the computing performance.

This solution can be implemented automatically inside a compiler and is completely transparent to users, so that users do not need to know how and where to perform configuration. In addition, the embodiments of the present disclosure also benefit the load balancing scheduling. The fusion of computing tasks with low resource demands can promote the load balancing among a plurality of computing devices or computing nodes, e.g., can avoid a situation where some computing devices only process computing tasks with low resource demands and waste the computing resources. In particular, when the computing task combination of the embodiments of the present disclosure is used in combination with the above-mentioned tiling solution, both the combined computing task and the tiled computing task (e.g., all computations in a reconstructed computation graph) will be of a medium size, which not only contributes to the load balancing scheduling, but also contributes to the data movement efficiency.

Figure 8:
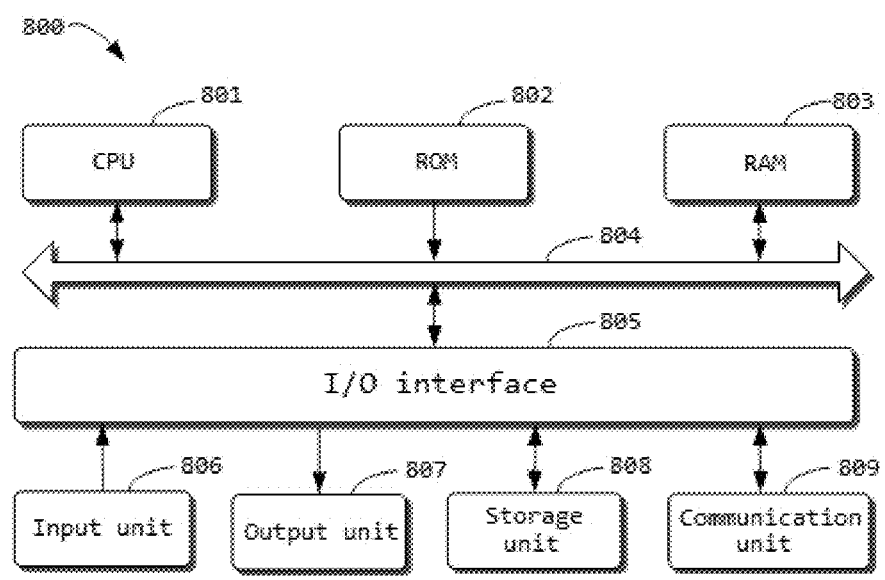
FIG. 8 shows a block diagram of an example device that may be configured to implement the embodiments of the present disclosure.

FIG. 8 shows a schematic block diagram of example device 800 that may be configured to implement the embodiments of the present disclosure. As shown in the figure, device 800 includes central processing unit (CPU) 801, which may execute various appropriate actions and processing in accordance with computer program instructions stored in read-only memory (ROM) 802 or computer program instructions loaded onto random access memory (RAM) 803 from storage unit 808. In RAM 803, various programs and data required for the operation of device 800 may also be stored. CPU 801, ROM 802, and RAM 803 are connected to each other through bus 804. Input/output (I/O) interface 805 is also connected to bus 804.

A plurality of components in device 800 are connected to I/O interface 805, including: input unit 806, such as a keyboard and a mouse; output unit 807, such as various types of displays and speakers; storage unit 808, such as a magnetic disk and an optical disk; and communication unit 809, such as a network card, a modem, and a wireless communication transceiver. Communication unit 809 allows device 800 to exchange information/data with other devices via a computer network such as the Internet and/or various telecommunication networks.

Processing unit 801 executes various methods and processing described above, e.g., either of processes 300 and 400. For example, in some embodiments, either of processes 300 and 400 may be embodied as a computer software program or a computer program product that is tangibly included in a machine-readable medium, e.g., storage unit 808. In some embodiments, some or all of the computer program can be loaded into and/or installed onto device 800 via ROM 802 and/or communication unit 809. When the computer program is loaded into RAM 803 and executed by CPU 801, one or more steps of either of processes 300 and 400 described above can be executed. Alternatively, in other embodiments, CPU 801 may be configured in any other suitable manner (e.g., with the help of firmware) to implement either of processes 300 and 400.

According to some embodiments of the present disclosure, a computer-readable medium having a computer program stored thereon is provided, where the program, when executed by a processor, implements the method according to the present disclosure.

Those skilled in the art should understand that the steps of the above method of the present disclosure may be implemented by a general-purpose computing apparatus, and may be centralized on a single computing apparatus or distributed over a network composed of a plurality of computing apparatuses. Optionally, they may be implemented using program code executable by a computing apparatus, so that they may be stored in a storage apparatus and executed by the computing apparatus, or they may be made into integrated circuit modules respectively, or they may be implemented by making a plurality of modules or steps of them into a single integrated circuit module. Thus, the present disclosure is not limited to any particular combination of hardware and software.

It should be understood that although some apparatuses or sub-apparatuses of the device are mentioned in the above detailed description, such division is merely illustrative rather than mandatory. In fact, the features and functions of two or more apparatuses described above may be embodied in one apparatus according to the embodiments of the present disclosure. On the contrary, the features and functions of one apparatus described above can be embodied by further dividing the apparatus into a plurality of apparatuses.

The above description presents illustrative embodiments of the present disclosure, and is not intended to limit the present disclosure. For those skilled in the art, the present disclosure may take on various modifications and alterations. Any modification, equivalent replacement, improvement, and the like made within the spirit and principle of the present disclosure should be encompassed in the scope of protection of the present disclosure.

What is claimed is:

1. A method for processing a computing job, comprising:
    determining a first dependency relationship between a plurality of computing tasks included in a to-be-processed computing job;
    determining, based on the first dependency relationship and demands of the plurality of computing tasks for computing resources, a group of computing tasks for combination from the plurality of computing tasks; and
    combining the group of computing tasks into a target computing task;
    wherein determining the group of computing tasks from the plurality of computing tasks comprises:
    determining, for each computing task of the plurality of computing tasks and based on the first dependency relationship, the number of computing tasks associated with at least one of an input or an output of a corresponding computing task;
    determining a first group of candidate tasks from the plurality of computing tasks, wherein the number determined for each candidate task is less than a threshold number;
    determining, based on demands of the first group of candidate tasks for the computing resources, a second group of candidate tasks for combination from the first group of candidate tasks; and
    selecting the group of computing tasks from the second group of candidate tasks.

2. The method according to claim 1, further comprising:
    determining, based on the first dependency relationship, a second dependency relationship between the target computing task and computing tasks that are other than the group of computing tasks in the plurality of computing tasks.

3. The method according to claim 1, wherein determining the second group of candidate tasks from the first group of candidate tasks comprises:
    determining the second group of candidate tasks by removing a candidate task with a demand for the computing resources exceeding a first threshold from the first group of candidate tasks.

4. The method according to claim 1, wherein selecting the group of computing tasks from the second group of candidate tasks comprises:
    determining, based on the first dependency relationship, a first candidate task and a second candidate task in the second group of candidate tasks, wherein the first candidate task does not depend on other candidate tasks in the second group of candidate tasks, and the second candidate task depends on the first candidate task;
    estimating a first demand of a first combined task that combines the first candidate task and the second candidate task for the computing resources; and
    selecting, if it is determined that the estimated first demand is less than a second threshold, the first candidate task and the second candidate task as at least a part of the group of computing tasks.

5. The method according to claim 4, further comprising:
    estimating, if it is determined that the second group of candidate tasks includes a third candidate task depending on the second candidate task, a second demand of a second combined task that combines the first combined task and the third candidate task for the computing resources; and
    adding, if it is determined that the estimated second demand is less than the second threshold, the third candidate task into the group of computing tasks.

6. The method according to claim 4, further comprising:
determining, if it is determined that a third candidate task depending on the second candidate task is not included in the second group of candidate tasks, the first candidate task and the second candidate task as the group of computing tasks.

7. The method according to claim 1, wherein determining the first dependency relationship comprises:
obtaining a computation graph representing the computing job, a vertex in the computation graph corresponding to a corresponding computing task among the plurality of computing tasks; and
determining the first dependency relationship from the computation graph.

8. The method according to claim 1, wherein combining the group of computing tasks into the target computing task comprises:
obtaining a group of generation logics corresponding to the group of computing tasks, each generation logic in the group of generation logics being used for generating an executable instruction for a corresponding computing task; and
combining the group of generation logics into a target logic for generating an executable instruction for the target computing task.

9. The method according to claim 1, wherein the computing resources comprise at least one of memory resources and thread resources.

10. An electronic device, comprising:
a processor; and
a memory coupled to the processor and having instructions stored therein, wherein the instructions, when executed by the processor, cause the device to execute actions comprising:
determining a first dependency relationship between a plurality of computing tasks included in a to-be-processed computing job;
determining, based on the first dependency relationship and demands of the plurality of computing tasks for computing resources, a group of computing tasks for combination from the plurality of computing tasks; and
combining the group of computing tasks into a target computing task;
wherein determining the group of computing tasks from the plurality of computing tasks comprises:
determining, for each computing task of the plurality of computing tasks and based on the first dependency relationship, the number of computing tasks associated with at least one of an input or an output of a corresponding computing task;
determining a first group of candidate tasks from the plurality of computing tasks, wherein the number determined for each candidate task is less than a threshold number;
determining, based on demands of the first group of candidate tasks for the computing resources, a second group of candidate tasks for combination from the first group of candidate tasks; and
selecting the group of computing tasks from the second group of candidate tasks.

11. The device according to claim 10, wherein the actions further comprise:
determining, based on the first dependency relationship, a second dependency relationship between the target computing task and computing tasks that are other than the group of computing tasks in the plurality of computing tasks.

12. The device according to claim 10, wherein determining the second group of candidate tasks from the first group of candidate tasks comprises:
determining the second group of candidate tasks by removing a candidate task with a demand for the computing resources exceeding a first threshold from the first group of candidate tasks.

13. The device according to claim 10, wherein selecting the group of computing tasks from the second group of candidate tasks comprises:
determining, based on the first dependency relationship, a first candidate task and a second candidate task in the second group of candidate tasks, wherein the first candidate task does not depend on other candidate tasks in the second group of candidate tasks, and the second candidate task depends on the first candidate task;
estimating a first demand of a first combined task that combines the first candidate task and the second candidate task for the computing resources; and
selecting, if it is determined that the estimated first demand is less than a second threshold, the first candidate task and the second candidate task as at least a part of the group of computing tasks.

14. The device according to claim 13, further comprising:
estimating, if it is determined that the second group of candidate tasks includes a third candidate task depending on the second candidate task, a second demand of a second combined task that combines the first combined task and the third candidate task for the computing resources; and
adding, if it is determined that the estimated second demand is less than the second threshold, the third candidate task into the group of computing tasks.

15. The device according to claim 13, further comprising:
determining, if it is determined that a third candidate task depending on the second candidate task is not included in the second group of candidate tasks, the first candidate task and the second candidate task as the group of computing tasks.

16. The device according to claim 10, wherein determining the first dependency relationship comprises:
obtaining a computation graph representing the computing job, a vertex in the computation graph corresponding to a corresponding computing task among the plurality of computing tasks; and
determining the first dependency relationship from the computation graph.

17. The device according to claim 10, wherein combining the group of computing tasks into the target computing task comprises:
obtaining a group of generation logics corresponding to the group of computing tasks, each generation logic in the group of generation logics being used for generating an executable instruction for a corresponding computing task; and
combining the group of generation logics into a target logic for generating an executable instruction for the target computing task.

18. The device according to claim 10, wherein the computing resources comprise at least one of memory resources and thread resources.

19. A computer program product tangibly stored in a non-transitory computer-readable medium and comprising machine-executable instructions, wherein the machine-executable instructions, when executed, cause a machine to execute a method for processing a computing job, the method comprising:

determining a first dependency relationship between a plurality of computing tasks included in a to-be-processed computing job;

determining, based on the first dependency relationship and demands of the plurality of computing tasks for computing resources, a group of computing tasks for combination from the plurality of computing tasks; and combining the group of computing tasks into a target computing task;

wherein determining the group of computing tasks from the plurality of computing tasks comprises:

determining, for each computing task of the plurality of computing tasks and based on the first dependency relationship, the number of computing tasks associated with at least one of an input or an output of a corresponding computing task;

determining a first group of candidate tasks from the plurality of computing tasks, wherein the number determined for each candidate task is less than a threshold number;

determining, based on demands of the first group of candidate tasks for the computing resources, a second group of candidate tasks for combination from the first group of candidate tasks; and selecting the group of computing tasks from the second group of candidate tasks.

20. The computer program product according to claim 19, wherein the method executed by the machine further comprises:

determining, based on the first dependency relationship, a second dependency relationship between the target computing task and computing tasks that are other than the group of computing tasks in the plurality of computing tasks.

* * * * *